(12) United States Patent
Laubner et al.

(10) Patent No.: US 9,491,898 B2
(45) Date of Patent: Nov. 15, 2016

(54) LENGTH ADJUSTABLE LIFTING STRUT

(75) Inventors: Joachim Laubner, Ahrweiler (DE);
Achim Schröder, Troisdorf (DE);
Wolfgang Adamek, Lohmar (DE);
Marc Zimmermann, Siegburg (DE)

(73) Assignee: GKN Walterscheid GmbH, Lohmar (DE)

( * ) Notice: Subject to any disclaimer, the term of this patent is extended or adjusted under 35 U.S.C. 154(b) by 0 days.

(21) Appl. No.: 13/563,844

(22) Filed: Aug. 1, 2012

(65) Prior Publication Data
US 2013/0037283 A1 Feb. 14, 2013

(30) Foreign Application Priority Data
Aug. 8, 2011 (DE) .................. 10 2011 052 461

(51) Int. Cl.
*A01B 59/00* (2006.01)
(52) U.S. Cl.
CPC ................... *A01B 59/004* (2013.01)
(58) Field of Classification Search
CPC . A01B 59/004; A01B 59/043; A01B 59/066
USPC ............................... 172/439, 448
See application file for complete search history.

(56) References Cited

U.S. PATENT DOCUMENTS

| | | | | |
|---|---|---|---|---|
| 346,771 A * | 8/1886 | Phillips | ............... | 267/71 |
| 1,374,963 A * | 4/1921 | Stevenson | ............... | 403/44 |
| 1,420,460 A * | 6/1922 | Sullivan | ............... | 403/43 |
| 2,359,492 A * | 10/1944 | Rockwood et al. | ............... | 403/43 |
| 2,500,488 A * | 3/1950 | Durbin et al. | ............... | 24/270 |
| 2,573,221 A * | 10/1951 | Romig | ............... | 172/261 |
| 2,793,892 A * | 5/1957 | Hutterer | ............... | 292/36 |
| 2,844,397 A * | 7/1958 | Du Shane | ............... | 403/44 |
| 3,310,123 A * | 3/1967 | Abbott | ............... | 172/450 |
| 3,418,008 A * | 12/1968 | Durbin | ............... | 24/270 |
| 3,591,141 A * | 7/1971 | Ratcliff | ............... | 24/270 |
| 3,708,017 A * | 1/1973 | Alexandrovsky et al. | ... | 172/239 |
| 3,731,951 A * | 5/1973 | Gruenberger | ............... | 172/439 |
| 3,837,701 A * | 9/1974 | Curtis et al. | ............... | 296/167 |
| 3,910,354 A * | 10/1975 | Johnson et al. | ............... | 172/267 |
| 4,418,935 A | 12/1983 | O'Connor | | |
| 4,422,218 A * | 12/1983 | Brasseux | ............... | 24/68 CT |
| 4,778,194 A * | 10/1988 | Koch et al. | ............... | 172/448 |
| 4,865,134 A * | 9/1989 | Rugen et al. | ............... | 172/450 |
| 5,042,588 A | 8/1991 | Herchenbach et al. | | |
| 5,197,552 A * | 3/1993 | Di Maria | ............... | 172/264 |
| 5,732,864 A | 3/1998 | Stapleton | | |
| 6,056,069 A | 5/2000 | Hagen et al. | | |
| 6,131,937 A * | 10/2000 | Coenen | ............... | 280/455.1 |

(Continued)

FOREIGN PATENT DOCUMENTS

| | | |
|---|---|---|
| DE | 1096102 | 12/1960 |
| DE | 1238706 | 4/1967 |

(Continued)

*Primary Examiner* — Thomas B Will
*Assistant Examiner* — Joel F. Mitchell
(74) *Attorney, Agent, or Firm* — Harness, Dickey & Pierce, P.L.C.

(57) ABSTRACT

A length adjustable lifting strut (1) for a hitch linkage of a tractor has two connection elements (11, 12) for connecting the lifting strut (1) to components (43, 44) of the hitch linkage. A fine adjustment mechanism 17 is provided on the lifting strut (1) to finely adjust the length of the lifting strut 1. A quick adjustment mechanism (21) is provided to adjust the lifting strut (1) length and is retainable in at least two discrete positions.

11 Claims, 3 Drawing Sheets

(56) References Cited

U.S. PATENT DOCUMENTS

| | | | |
|---|---|---|---|
| 6,609,575 B1 | 8/2003 | Crabb | |
| 7,048,071 B1 * | 5/2006 | Huenink et al. | 172/439 |
| 7,219,951 B2 * | 5/2007 | Rasmussen | 296/156 |
| 7,237,977 B2 * | 7/2007 | Kay | 403/43 |
| 8,464,802 B2 * | 6/2013 | Potter | 172/439 |
| 2003/0159842 A1 | 8/2003 | Casali et al. | |

FOREIGN PATENT DOCUMENTS

| | | |
|---|---|---|
| DE | 3938418 | 3/1991 |
| DE | 4022343 | 1/1992 |
| DE | 602 13 755 | 11/2006 |
| EP | 1 332 657 | 8/2003 |
| EP | 1 982 570 | 10/2008 |
| EP | 2 130 420 | 12/2009 |

* cited by examiner

LENGTH ADJUSTABLE LIFTING STRUT

CROSS-REFERENCE TO RELATED APPLICATION

This application claims priority to German Patent Application No. 102011052461.4 filed Aug. 8, 2011. The entire disclosure of the above application is incorporated herein by reference.

FIELD

The disclosure relates to a length adjustable lifting strut for a lower link of a hitch linkage of a tractor that can be lifted and lowered via a power drive. Two connection elements connect the lifting strut to the power drive of the tractor and to a lower link. Furthermore, an adjustment element is provided with threads arranged on two ends of the adjustment element that extend in opposite directions. One of the connection elements is screwed, by a thread, to the adjustment element.

BACKGROUND

A lifting strut is known from DE 39 38 418 C1. The adjustment element can be pivoted via a gripping sleeve. The two connection elements are non-rotationally connected to the power drive of the tractor or to the lower link. Thus, by turning the adjustment element, the length of the lifting strut can be adapted to the to be used implement. Comparable lifting struts are also known from DE 1 096 102 B as well as DE 40 22 343 C2.

Today's tractors, besides having a three-point hitch also include towing hitches, in the form of Piton couplings or ball couplings, by which trailers are towed. When coupling a trailer, which is to be towed via a low towing hitch (low hitch arrangement), the lower links of the three-point hitch are often arranged in the collision area of the drawbar of the trailer. Therefore, the lower links have to be pivoted out of the movement area of the drawbar or have to be completely removed. The known solutions of lifting struts can, however, only be shortened in a limited manner and do not achieve a minimal length, at which the lower links are pivoted out of the potential collision area of the trailer drawbar.

SUMMARY

Thus, it is an object of the present disclosure to provide a lifting strut that has a larger displacement path.

The object is solved by a length adjustable lifting strut for a hitch linkage of a tractor that comprises two connection elements to connect the lifting strut to the components of the hitch linkage. A fine adjustment mechanism finely adjusts the length of the lifting strut. A quick adjustment mechanism adjusts the lifting strut length and is retainable in at least two discrete positions.

Thus, the length of the lifting strut, according to the disclosure, can be precisely adjusted via the fine adjustment mechanism. Besides this adjustment, the quick adjustment mechanism is provided to enable an additional adjustment path. Thus, the lifting strut is adjustable to a shorter length. Further, the lifting strut can be transferred quickly into a parking position without a long drawn-out adjustment of the fine adjustment mechanism. Here the lower link is no longer arranged in the collision area of the trailer drawbar.

Preferably, the fine adjustment mechanism includes an adjustment element with threads arranged on two ends and extending in opposite directions. In this case, the connection elements have, respectively, a thread, that the connection elements are screwed to the threads of the adjustment element.

For fine adjustment, the fine adjustment mechanism can be adjusted continuously (free of steps) or in smaller steps than the quick adjustment mechanism.

In an embodiment of the disclosure, the quick adjustment mechanism includes a hinge that displaces the lifting strut between an aligned position and an angled position. By angling the lifting strut, the length of the lifting strut can be significantly shortened.

Such a hinge can naturally be provided in at least one of the two connection elements.

The first connection element has an attachment mechanism to connect the first connection element to a power drive of the hitch linkage. The second connection element has an attachment mechanism that connects the lifting strut to a lower link of the hitch linkage.

The hinge includes a first hinge element and a second hinge element. The first and second hinge elements are pivotably connected to each other around a hinge axis. The first hinge element is connected to a first part of the adjustment element. The second hinge element is connected to a second part of the adjustment element.

In this case, the first part of the adjustment element has a thread. The adjustment element is then threadably connected to the first connection element. The second part of the adjustment element has a thread. Likewise, the adjustment element is threadably connected to the second connection element.

A retaining mechanism is provided to retain the lifting strut in the aligned position. Further, a retaining mechanism can be provided to retain the lifting strut in the angled position. The retaining mechanisms can, respectively, be separate retaining mechanisms or identical retaining mechanisms.

Preferably, the retaining mechanism has a retaining pin that is insertable in the aligned position in retaining bores of the two hinge elements. Thus, the two hinge elements are supported via the retaining pin on each other. In this case, the retaining pin is arranged parallel to the hinge axis.

The retaining mechanism that retains the lifting strut in the angled position can also include a retaining pin. The retaining pin is the same retaining pin that is used to retain the lifting strut in the aligned position. The pin is insertable in the angled position into at least one retaining bore of one of the two hinge elements. The other hinge element can then be supported in a pivot direction on the retaining pin, so that the first connection element cannot be moved from the angled position in a direction to the aligned position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
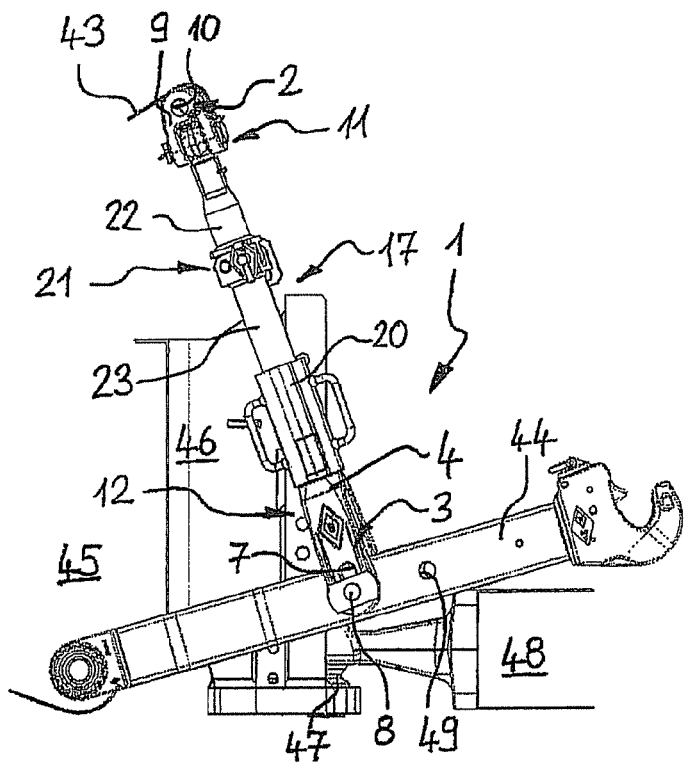
FIG. 1 is a side elevation view of a lifting strut according to the disclosure in an aligned position on a hitch linkage in form of a three-point hitch of a tractor.
Figure 2:
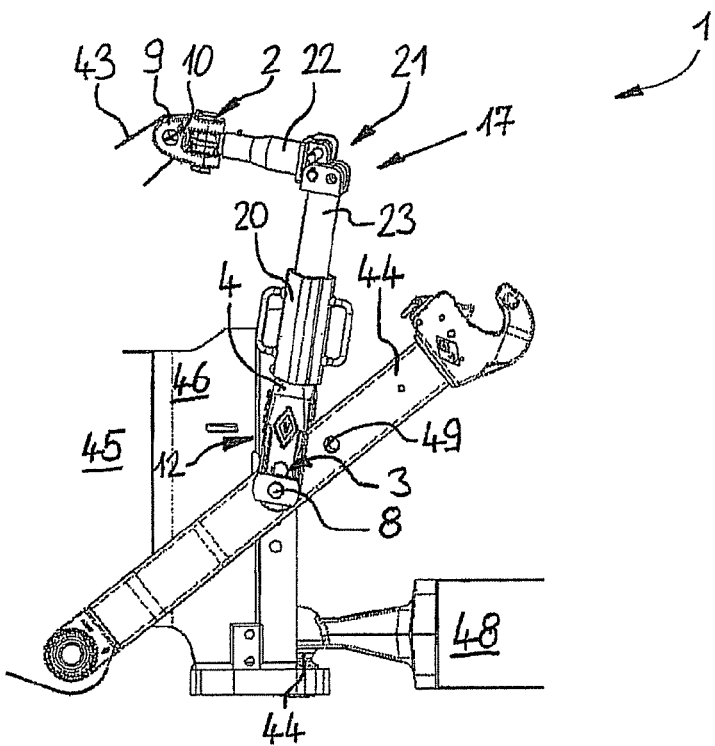
FIG. 2 is a view like FIG. 1 of the lifting strut in an angled position forming a knee.

FIGS. 1 to 5 illustrate a lifting strut 1 in different views and are described in the following together. The lifting strut 1 extends along a longitudinal axis L and has at an upper end, relative to the installation position, with a first attachment mechanism 2. A lower end has second attachment mechanism 3. The first attachment mechanism 2 includes an attachment element 9, with a bore 10, which extension axis intersects the longitudinal axis L. The attachment element 9, via the bore 10, as shown in FIG. 1, can be connected to a power drive 43 to lift and lower the lower links 44 of a three-point hitch at the rear 45 of a tractor. To also enable a lateral pivoting of the lower links 44, the attachment element 9 is pivotably arranged around a pivot axis V in relation to the remaining part of the lifting strut 1. The pivot axis V intersects the longitudinal axis L at a right angle. In FIG. 1 an attachment bracket 46 is shown. The attachment bracket 46 is arranged between the two lower links 44 and has a trailer coupling 47 (here a ball coupling) to tow a trailer via a drawbar 48.

The second attachment mechanism 3 includes a fork 4 with two fork arms 5, 6. For the assembly, the fork arms 5, 6 embrace the lower link 44. Elongated holes 7 are provided in the fork arms 5, 6 for passage of a pin 8 to attach the fork arms 5, 6 with the lower link 44. The pin 8 is also passed in the assembled condition through an attachment bore 49 in the lower link, so that the lifting strut 1 is connected to the lower link 44.

The lifting strut 1 includes a first connection element 11, connected with the first attachment mechanism 2, as well as a second connection element 12, connected with the second attachment mechanism 3. The two connection elements 11, 12 are displaceable relative to each other along the longitudinal axis L. The first connection element 11 has a trunnion 13 with an outer thread 14. The second connection element 12 also has a trunnion 15 with an outer thread 16. A fine adjustment mechanism is provided with an adjustment element 17 that has at a first end with an inner thread 18 and a second end with an inner thread 19. The first and second ends extend in opposite directions. The outer thread 14 of the first connection element 11 is screwed into one of the inner threads 18 of the adjustment element 17. The outer thread 16 of the second connection element 12 is screwed into the other inner thread 19 of the adjustment element 17. Thus, by means of turning the adjustment element 17 the two connection elements 11, 12 can be moved towards each other or away from each other. A gripping element 20, which is non-rotationally connected to the adjustment element 17, serves to adjust the adjustment element 17.

Besides ensuring fine adjustment, via the adjustment element 17, the device also provides a quick length adjustment along the largest possible adjustment path, via a quick adjustment mechanism with a hinge 21. The hinge 21 separates the adjustment element 17 into two components. It includes a first part 22 that has one of the inner threads 18, as well as a second part 23, that has the other of the two inner threads 19. Via the hinge 21, the two parts 22, 23 can be displaced between the aligned position, shown in FIG. 1, and the angled position, shown in FIG. 1.

Figure 3:
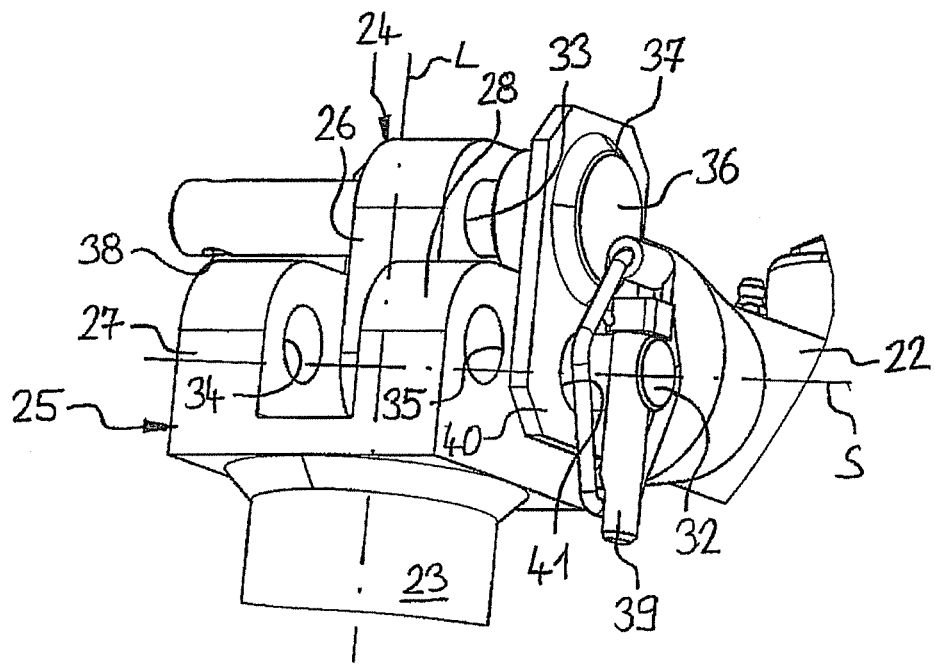
FIG. 3 is an enlarged perspective view of the hinge.
Figure 4:
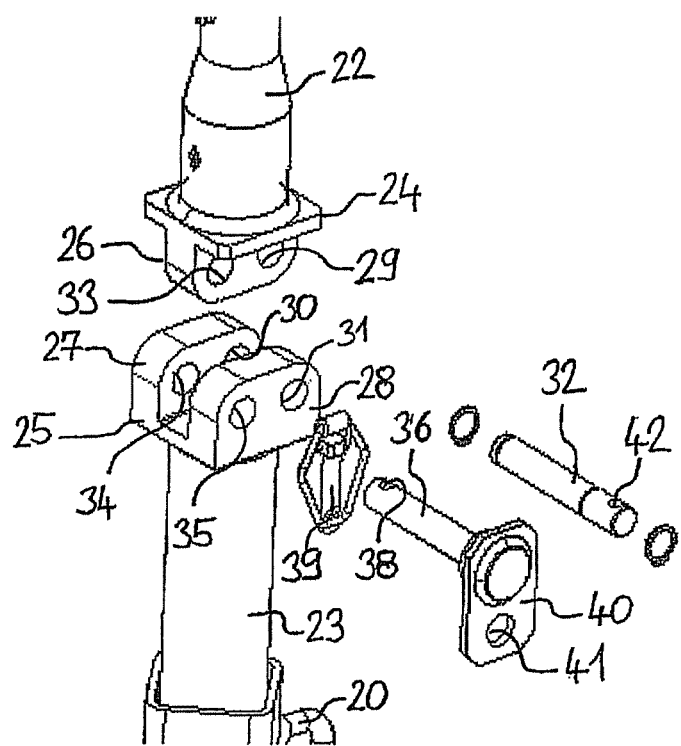
FIG. 4 is an exploded perspective view of the area of the hinge of the lifting strut according to FIG. 1.
Figure 5:
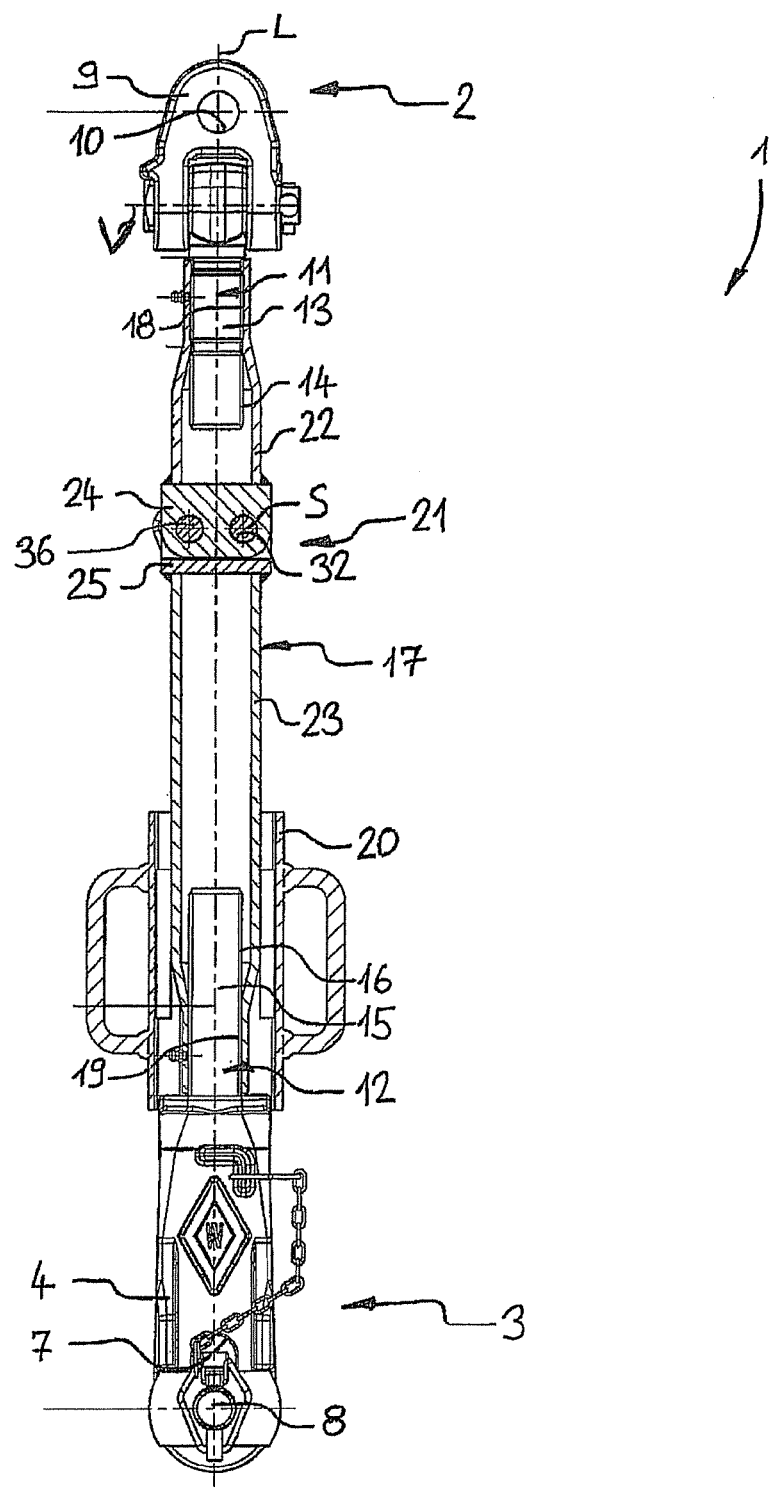
FIG. 5 is a longitudinal sectional view of the lifting strut according to FIG. 1.

FIG. 3 shows in an enlarged perspective view of the hinge 21. The hinge 21 includes a first hinge element 24 that is connected to the first part 22 of the adjustment element 17. The hinge 21 has a second hinge element 25 that is connected to the second part 23 of the adjustment element 17. The first hinge element 24 has a central lug 26. The second hinge element 25 is formed fork-like with a first fork arm 27 and a second fork arm 28. The two fork arms 27, 28 enclose the central lug 26 of the first hinge element 24. A hinge bore 29 is provided in the central lug 26. A hinge bore 30, 31, aligned with the hinge bore 29 of the central lug 26, is provided in each of the fork arms 27, 28. Through the hinge bores 29, 30, 31, a hinge pin 32 is passed and axially secured. The hinge pin 32, as well as the hinge bores 29, 30, 31, coaxially align with the hinge axis S. The hinge axis S intersects the longitudinal axis L at a distance. Principally however, it can also intersect the longitudinal axis L.

A retaining bore 33 is provided in the central lug 26. The retaining bore 33 is arranged parallel to the hinge bore 29. The fork arms 27, 28 include retaining bores 34, 35, that are arranged parallel to the hinge bores 30, 31 of the fork arms 27, 28. In the aligned position of the lifting strut 1 according to FIG. 1, all retaining bores 33, 34, 35 are aligned. A retaining pin 36 is passed through the retaining bores 33, 34, 35, so that the lifting strut 1 is secured in the aligned position. The parallel arrangement of the hinge bores 29, 30, 31 relative to the retaining bores 33, 34, 35 and the arrangement of all bores with a distance to the longitudinal axis L, ensure the most favorable support against buckling moments.

The retaining pin 36 has a pin head 37, which has a larger diameter than the retaining bores 33, 34, 35. Thus, in an insertion direction an axial abutment is provided. On an end facing away from the pin head 37, the retaining pin 36 has a securing bore 38. The securing bore 38 extends transversally through the retaining pin 36. A securing pin 39 is passed through the securing bore 38 to prevent an unintentional pulling-out of the retaining pin 36.

In order to angle the lifting strut 1, the retaining pin 36 is pulled out of the retaining bores 33, 34, 35. The first part 22 of the adjustment element 17 is angled relative to the second part 23 of the adjustment element 17 around the pivot axis S. In the angled position, shown in FIG. 2, the central lug 26 is partially pivoted out of the intermediate space between the fork arms 27, 28. Thus, the retaining bore 33 is not enclosed anymore by the fork arms 27, 28. In this position, the retaining pin 36 can be passed through the retaining bore 33 of the central lug 26. When pivoting the lifting strut 1 back in the direction towards the aligned position, the retaining pin 36 abuts externally the fork arms 27, 28 and prevents a transfer of the lifting strut 1 in the direction to the aligned position.

A head plate 40 is additionally arranged on the pin head 37 of the retaining pin 36. The head plate 40 extends vertically to the retaining pin 36. A securing bore 41 is provided in the head plate 40. The securing bore 41 extends parallel to the retaining pin 36. In the angled position, the head plate 40 can be pushed onto a projecting end of the hinge pin 32. A securing bore 42, extending transversally to the hinge pin 32, is provided in the projecting end of the hinge pin 32. The securing pin 39 can be inserted into the securing bore 42 so that a pulling-out of the retaining pin 36 from the retaining bore 33 of the central lug 26 is prevented.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A length adjustable lifting strut for a hitch linkage of a tractor, comprising:
   two connection elements for connecting the lifting strut to components of the hitch linkage;
   a fine adjustment mechanism for finely adjusting length of the lifting strut, said fine adjustment mechanism comprising an adjustment element having two ends each connected to one of said two connection elements; and
   a quick adjustment mechanism readily adjustable by a user, the quick adjustment mechanism forming a part of the lifting strut for adjusting length of the lifting strut in at least two discrete lifting positions, said quick adjustment mechanism further comprises a hinge connecting a first part of the adjustment element and a second part of the adjustment element pivotably with respect to each other, the hinge moving the adjustment element, as well as the two connection elements, between an aligned lifting position and an angled lifting position;
   a retaining mechanism includes a pin coupling with the hinge securing and locking the quick adjustment mechanism of the lifting strut in both the aligned lifting position and the angled lifting position such that the lifting strut can lift an implement in both the aligned and angled lifting positions during use.

2. Thee length adjustable lifting strut according to claim 1, wherein the two ends of the adjustment element both comprise threads and extend in opposite directions to one another, and the connection elements include a thread so that the connection elements are threadably connected with the threads of the adjustment element.

3. The length adjustable lifting strut according to claim 1, wherein the fine adjustment mechanism is continuously adjustable in smaller steps than the quick adjustment mechanism.

4. The length adjustable lifting strut according to claim 1, wherein the hinge is arranged in the adjustment element.

5. The length adjustable lifting strut according to claim 1, wherein the retaining mechanism retaining the pin insertable into retaining bores in the hinge.

6. The length adjustable lifting strut according to claim 1, wherein the hinge comprises a first hinge element and a second hinge element, the first and second hinge elements are pivotably connected to each other around a hinge axis.

7. The length adjustable lifting strut according to claim 6, wherein the first hinge element is connected to the first part of the adjustment element and that the second hinge element is connected to a second part of the adjustment element.

8. The length adjustable lifting strut according to claim 6, wherein the first part of the adjustment element has one thread threadably connected to the first connection element; and the second part of the adjustment element has another thread threadably connected to the second connection element.

9. The length adjustable lifting strut according to claim 6, wherein the retaining mechanism comprises a retaining pin insertable at least into one retaining bore in one of the two hinge elements and on which another of the two hinge element can be supported in the pivot direction.

10. A length adjustable lifting strut for a hitch linkage of a tractor, comprising:
    two connection elements for connecting the lifting strut to components of the hitch linkage;
    a fine adjustment mechanism for finely adjusting length of the lifting strut, said fine adjustment mechanism comprising an adjustment element having two ends each connected to one of said two connection elements;
    a quick adjustment mechanism easily adjustable by an user, the quick adjustment mechanism forming a part of the lifting strut for adjusting length of the lifting strut in at least tow discrete positions said quick adjustment mechanism further comprises a hinge connecting a first part of the adjustment element and a second part of the adjustment element pivotably with respect to each other, the hinge moving the first part of the adjustment element and the second part of the adjustment element between an aligned lifting position and an angled lifting position; and
    a retaining mechanism includes a pin coupling with the hinge securing and locking the quick adjustment mechanism of the lifting strut in both lifting position such that the lifting strut can lift an implement in both the aligned and angled lifting positions during use.

11. A hitch linkage for a tractor, comprising:
    a lower link;
    a length adjustable lifting strut comprising:
    a first connection element for connecting the lifting strut to a power driver for lifting the hitch linkage and a second connection element being pivotably connected to the lower link;
    a fine adjustment mechanism for finely adjusting length of the lifting strut, said fine adjustment mechanism comprising an adjustment element having two ends each connected to one of said two connection elements; and
    a quick adjustment mechanism readily adjustable by a user, the quick adjustment mechanism adjusting length of the lifting strut in at least two discrete positions, said quick adjustment mechanism further comprises a hinge connecting a first with respect to each other, the hinge moving the adjustment mechanism with the two connection elements between an aligned lifting position and an angled lifting position;
    a retaining mechanism retains and locks the quick adjustment mechanism of the lifting in both the aligned lifting position and the angled lifting position.

* * * * *

UNITED STATES PATENT AND TRADEMARK OFFICE
CERTIFICATE OF CORRECTION

PATENT NO.        : 9,491,898 B2
APPLICATION NO.   : 13/563844
DATED             : November 15, 2016
INVENTOR(S)       : Joachim Laubner et al.

Page 1 of 1

It is certified that error appears in the above-identified patent and that said Letters Patent is hereby corrected as shown below:

On the Title Page

Item (30) Foreign Application Priority Data, "102011052461" should be --102011052461.4--.

In the Claims

Column 5
Line 32, Claim 2        "Thee" should be --The--.
Line 45, Claim 5        delete "retaining" and insert --includes--.
Line 54, Claim 7        delete "a" and insert --the--.

Column 6
Line 7, Claim 9         after "of", delete "the".
Line 9, Claim 9         "element" should be --elements--.
Line 9, Claim 9         delete "the" and insert --a--.
Line 21, Claim 10       "tow" should be --two--.
Line 21, Claim 10       after "positions", insert --,--.
Line 31, Claim 10       "position" should be --positions--.
Line 38, Claim 11       "driver" should be --drive--.
Line 49, Claim 11       after "first", insert --part of the adjustment element and a second part of the adjustment element pivotably--.
Line 54, Claim 11       after "lifting", insert --strut--.

Signed and Sealed this
Eighteenth Day of April, 2017

Michelle K. Lee
*Director of the United States Patent and Trademark Office*